3,272,792
QUATERNARY AMMONIUM SALTS OF AMINO HALOHYDRIN DYESTUFFS
David Taber, Wilmette, Ill., Edgar E. Renfrew, White Bear Lake, Minn., and Henry W. Pons, Lock Haven, Pa., assignors to American Aniline Products, Inc., a corporation of Delaware
No Drawing. Filed June 22, 1964, Ser. No. 377,131
3 Claims. (Cl. 260—155)

This application is a continuation-in-part of our copending application Serial No. 160,233, filed December 18, 1961, and now abandoned.

This invention relates to new dyestuffs and to the coloring of cellulosic and other textile materials therewith. In one specific aspect, it relates to new water-soluble dyestuffs having directly attached to the same aromatic ring at least two groups comprising a quaternary ammonium salt of an amino halohydrin.

In recent years there has been considerable interest in the manufacture of water-soluble dystuffs containing triazine or pyrimidine rings to which there are attached reactive halogen atoms. These classes of dyestuffs are believed to react with the functional groups of cellulosic and other fibers and, as a result, give colorations which are extremely resistant to wet treatments. The dyestuffs must contain at least one ionogenic solubilizing group; e.g., sulfonic acid or carboxylic acid groups, to make them sufficiently water-soluble to be applied from an aqueous bath. The requirement for at least one sulfonic acid or carboxylic acid group thus imposes a limitation on the type of colored compound that can be used to synthesize the dyestuffs.

We have found that unexpectedly superior water-soluble dyestuffs can be made from water-insoluble dyestuffs, free of ionogenic solubilizing groups, by converting to quaternary ammonium salts a water-insoluble dyestuff containing amino halohydrin groups, at least two of which are directly attached to the same aromatic ring of the dyestuff moiety. Our new dyestuffs, when applied to cellulosic or other textile materials by dyeing or printing in the presence of an acid-binding agent, react with the fiber to give bright colorations which have good wash fastness.

It is, therefore, an object of the present invention to provide a new class of water-insoluble dyestuffs solubilized by the presence of at least two groups comprising a quaternary ammonium salt of an amino halohydrin, at least two of these groups being directly attached to the same aromatic ring of the dyestuff moiety.

In accordance with the invention, we have discovered dyestuffs of the formula:

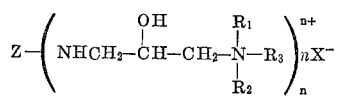

wherein Z is a water-insoluble aromatic dyestuff moiety of the azo or anthraquinone series, as recognized by the Colour Index, 2nd edition, 1956; $n$, the number of reactive functional groups, is a small whole number having a value of from 2 to 4; $R_1$ as an individual substituent, is a member selected from the group consisting of lower alkyl and phenyl, $R_2$ and $R_3$, as individual substituents, are lower alkyl, and $R_1$, $R_2$ and $R_3$, taken collectively, represent the residue of an azaaromatic nucleus selected from the group consisting of pyridine, methylpyridines, quinoline and isoquinoline; and X is chlorine or bromine. The Z term, representing the dyestuff moiety, is free of ionogenic solubilizing groups. The secondary amino nitrogen of at least 2 of the $n$ functional groups is linked directly to one aromatic ring of the Z moiety.

The new dyestuffs can be made by the interaction of one mole of a water-insoluble primary amine of the azo or anthraquinone series having at least two amino groups attached to one aromatic ring with at least one mole of epichloro- or epibromohydrin per amino group to form a water-insoluble amino halohydrin dyestuff intermediate. This intermediate is converted to its corresponding water-soluble quaternary ammonium salt by reacting it with a tertiary amine.

In lieu of the epichloro- or epibromohydrin used to prepare the 2-hydroxy-3-bromopropylamino intermediates, the arylamines can be reacted with an allyl halide; e.g., allyl chloride or allyl bromide, to form an allylamine which by reaction with hypobromous or hypochlorous acid is converted to an intermediate useful in the invention.

The water-insoluble primary amine colorants of the azo series suitable for making the dyestuffs of the invention can be made in a variety of ways. One method is to couple a diazotized arylamine, which is free of other groups convertible to amino groups, with either (1) an aryldiamino coupling component which accepts diazonium salts without involvement, (2) an aryldiamine containing amino groups protected by a hydrolyzable group which can be converted to a free amine by hydrolysis, or (3) a coupling component containing nitro groups which can be reduced to amino groups after the coupling reaction.

Alternatively, arylamines containing nitro groups can be diazotized and coupled with (1) an arylamino coupling component which accepts diazonium salts without involvement, (2) an arylamine containing an amino group protected by a hydrolyzable group, (3) a coupling component free of amino groups, or (4) a coupling component containing a nitro group which can be reduced to an amino group after the coupling reaction. The nitro groups are then reduced to amino groups to form colorants useful in the invention.

Water-insoluble amines, free of other groups not readily convertible to amino groups, for which useful diazonium salts can be made include, but are not limited to, aniline, o-, m- and p-toluidine, 2,4- and 2,5-xylidine, o-, m- and p-anisidine, o-, m- and p-phenetidine, o-, m- and p-chloroaniline, o-, m- and p-bromoaniline, o-, m- and p-fluoroaniline, 2,4- and 2,5-dichloroaniline, trichloroaniline, 1-naphthylamine, 2-naphthylamine, 5-aminotetralin, 6-aminotetralin, 2-methyl-1-naphthylamine, 3-methyl-1-naphthylamine, 4-methyl-1-naphthylamine, 5-methyl-1-naphthylamine, 6-methyl-1-naphthylamine, 7-methyl-1-naphthylamine, 8-methyl-1-naphthylamine, 1-methyl-2-naphthylamine, 3-methyl-2-naphthylamine, 4-methyl-2-naphthylamine, 5-methyl-2-naphthylamine, 6-methyl-2-naphthylamine, 7-methyl-2-naphthylamine, 8-methyl-2-naphthylamine, 2-ethyl-1-naphthylamine, 4-ethyl-1-naphthylamine, 7 - ethyl - 1 - naphthylamine, 2,3-dimethyl-1-naphthyl - naphthylamine, 2,6 - dimethyl - 1 - naphthyl - naphthylamine, 1,7 - dimethyl - 2 - naphthyl - naphthylamine, 1,4 - dimethyl - 2 - naphthylamine, 3,6 - dimethyl-2-naphthylamine, 4-phenyl-1-naphthylamine, 6-phenyl-1-naphthylamine, 7-phenyl-1-naphthylamine, 6-phenyl-2-naphthylamine, 2-chloro-1-naphthylamine, 3-chloro-1-naphthylamine, 4-chloro-1-naphthylamine, 5-chloro-1-naphthylamine, 6-chloro-1-naphthylamine, 7-chloro-1-naphthylamine, 8-chloro-1-naphthylamine, 1-chloro-2-naphthylamine, 3-chloro-2-naphthylamine, 4-chloro-2-naphthylamine, 5-chloro-2-naphthylamine, x-halo - y-methyl-1-naphthylamine, x-halo-y-methyl-2-naphthylamine, x,y-dihalo-1-naphthylamine, x,y-dihalo-2-naphthylamine, 1- or 2-aminoanthraquinone, o-, m- and p- aminobenzanilide, o-, m- and p-aminoacetanilide, 2- and 4-aminodiphenyl ether, sulfanilamide, metanilamide, orthanilamide, $N^1$-methyl-sulfanilamide, $N^1,N^1$-dimethylsulfanilamide, N¹-methylmetanilamide, N¹,N¹-dimethylsulfanilamide, o-, m- and p-aminoacetophenones, o-, m- and p-ethylaniline, o-, m- and p-isopropylaniline, dehydrothiotoluidine, primuline base, 4-benzamide-2,5-diethoxyaniline, pseudocumidine, 4'-amino-4-nitroacetanilide, 4'-amino-N-ethylacetanilide, 3-aminoanisanilide, 4'-amino-6'-methyl-m-benzanisidide, 4'-amino-2'-5'-dimethoxyacetanilide, p-amino-N-butylbenzamide, 4'-amino-5'-chloro-o-benzanisidide, 3-chloro-o-toludine, 3-bromo-o-toluidine, 4-bromo-o-toluidine, 4-chloro-o-toluidine, 2-chloro-m-toluidine, 4-chloro-m-toluidine, 2-bromo-m-toluidine, 4-bromo-m-toluidine, 2-bromo-p-toluidine, 3-bromo-p-toluidine, 2-chloro-p-toluidine, 3-chloro-p-toluidine, 5-methyl-o-anisidine, 2,5-dimethoxyaniline, 2,5-diethoxyaniline, 2-, 3- or 4-aminodiphenyl, 5-amino-o-toluenesulfonanilide, monobenzoyl-o-toluidine, monobenzoylbenzidine, N-phenyl-o-phenylenediamine, 4,4'-diaminodiphenylamine, N,N-diethyl-p-phenylenediamine, N,N-dimethyl-p-phenylenediamine and N-ethyl-p-phenylenediamine.

Among the coupling components which can be coupled with the diazonium salts listed hereabove to form the aminoazo compounds directly, there are included p-phenylenediamine, o-phenylenediamine, n-phenylenediamine, 4'-nitro-m-phenylenediamine, toluene-2,4-diamine, 4'-methoxy-m-phenylenediamine, 1,3-naphthalenediamine, 2,3-naphthalenediamine.

Those arylamines which contain an amino group protected by a hydrolyzable group which is converted to a free amino group after hydrolysis include m-acetamidoaniline and n-acetamidoaniline.

Coupling components which do not contain an amino group and must therefore be coupled with either a diazonium salt bearing nitro groups or acylamido groups which can then be converted to free amino groups or with a diazonium salt having attached thereto 2-hydroxy-3-halopropylamino groups include phenol, o-, m- and p-cresol, o-, m- and p-methoxyphenol, o-, m- and p-chlorophenol, o-, m- and p-bromophenol, catechol, resorcinol, o-, m- and p-ethoxyphenol, o-, m- and p-dimethylaminophenol, 1-naphthol, 2-naphthol, 5-hydroxytetralin, 6-hydroxytetralin, 6-ethyl-5-hydroxytetralin, 2,6-dimethyl-1-naphthol, 3-, 4-, 5-, 6-, 7- or 8-methyl-2-naphthol, 2-, 3-, 4-, 5-, 6-, 7- or 8-bromo-1-naphthol, 3-, 4-, 5-, 6-, 7- or 8-bromo-2-naphthol, 1-anthrol, 2-anthrol, 2-hydroxy-2-naphthoic acid, 3-hydroxy-2-naphthamide, N-methyl-3-hydoxy-2-naphthamide, 3-hydroxy-2-naphthanilide, and those compounds of this series commonly known as the naphthols (CI 37505 to CI 37580), 5-oxo-1-phenyl-2-pyrazoline-3-carboxamide, ethyl-5-oxo-1-phenyl-2-pyrazoline-3-carboxylate, 1-(m-chlorophenyl)-3-methyl-5-pyrazolone, 3-methyl-5-pyrazolone, 3-methyl-1-phenyl-5-pyrazolone, 3-methyl-1-(p-nitrophenyl)-5-pyrazolone, 3-methyl-1-(p-chlorophenyl)-5-pyrazolene, 3-methyl-1-(m-sulfamylphenyl)-5-pyrazolone, 3-methyl-1-(m-nitrophenyl)-5-pyrazolone, acetoacetanilide, o-acetoacetotoluidide, 2,4-acetoacetoxylidide, o-acetoacetanisidide, 2,5-dimethoxyacetoacetanilide, 4-chloro-2,5-dimethoxyacetoacetanilide, o-chloroacetoacetanilide, N,N-dimethylaniline, N,N-diethylaniline, N,N-di-n-propylaniline, 2-(N-ethylanilino)ethanol, 3-N-ethylanilino-1,2-propandiol, 2-(N-butylanilino)ethanol, 2,2'-(m-chloro-phenylamino)diethanol, 2-(m-tolylimino)diethanol, 3-(n-2-hydroxyethyl-m-toluidine)bispropionitrile, 1-sec-butyl-1,2,3,4-tetrahydro-H-7-methyl-3-quinolinol, 1,2,3,4-tetrahydrobenzo[h]quinoline-3-ol, 2,4-quinolinediol and 4-hydroxy-1-methylcarbostyril.

As we have noted, starting materials for new dyestuffs of the invention containing one or more azo groups can be obtained by an alternative process involving coupling a diazonium compound with a coupling component wherein either the diazonium compound or the coupling component, or both, has attached thereto amino halohydrin groups. In carrying out this alternative process, the coupling is preferably effected at a temperature below about 5° C., conveniently at a temperature between 0 and 5° C. and at as low a pH as is adequate for efficiency in coupling in order to minimize side reactions.

The water-insoluble primary aminoazo colorants used in the invention also include those containing more than one azo group. Useful diazonium salts may be formed by the tetrazotization of an aromatic diamine containing two primary amino groups and coupling the tetrazo compound thus formed with two moles of one of the above-defined amino-bearing coupling components or with one mole of each of two of the above-defined amino-bearing coupling components or with one mole of one of the above-defined amino-bearing coupling components and one mole of a coupling component having no amino groups. Suitable aromatic diamines include benzidine, 3,3'-dimethoxybenzidine, 3,30-dichlorobenzidine and 4,4'-diaminostilbene. Another method of forming the disazo or polyazo amines useful in the invention involves the use of the above-described processes with aromatic amines or diamines containing azo groups.

Useful aminoanthraquinones include 1,4-diaminoanthraquinone, 1,4-diamino-2,3-dibromoanthraquinone, 1,4-diamono-2,3-dichloroanthraquinone, 1,4-diamino-2,3-dicyanoanthraquinone and 1,4-diamono-2-methoxyanthraquinone.

Tertiary amines from which the quaternary ammonium salts of the invention can be made include trimethylamine, triethylamine, triisopropylamine, tri-n-butylamine, dimethylaniline, diethylaniline, pyridine, 2,4-lutidine, 2,6-lutidine, 2-picoline, 4-picoline, quinoline and isoquinoline.

In preparing the dyestuffs of the invention, the desired primary diamine of the azo or anthraquinone series is reacted with at least one mole of epichloro- or epibromohydrin per amino group, as shown hereunder, to form the amino halohydrin.

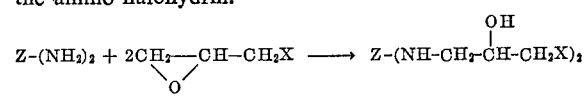

Z and X in the above equation have the values given aforesaid. Conveniently, the reaction is accomplished by adding to one mole of the amine in glacial acetic acid or formic acid, at least one mole of epichloro- or epibromohydrin per free amino group. Reaction is carried out at a temperature between 30 and 50° C., depending on the solvent used. The product amino halohydrin may partially precipitate during the reaction and the remainder of the product can be insolubilized by adding dilute acetic acid or water. The insolubilized product is then recovered by filtration.

Alternatively, the desired halohydrin can be obtained by reacting the arylamine with at least one mole of allyl chloride or bromide per free amino group, then adding hypochlorous or hypobromous acid across the double bond of the so-formed allylamine.

The quaternary ammonium salt is formed from the amino halohydrin according to the following equation:

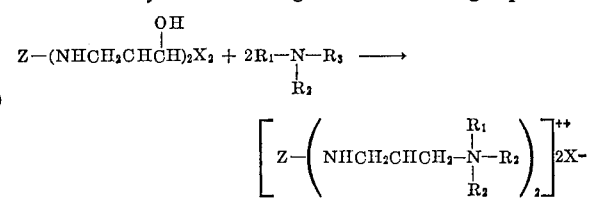

In the above equation Z, $R_1$, $R_2$, $R_3$ and X have the values given aforesaid. The reaction is conducted in a suitable solvent at a temperature between about 40° C. and the boiling point of the solvent. Useful solvents include an excess of the amine reactant, lower alkanols, such as methanol and ethanol, and dioxane. Conveniently, the reaction may be followed by testing a sample of the reaction mixture for water solubility, the reaction having gone to completion when the sample is completely soluble. Since two or more 2-hydroxy-3-halopropylamino functions are present in the same molecule, the reaction time may be extended beyond the time when a sample is entirely soluble in water in order to be certain that all of the functions have been quaternized. Upon cooling, the product precipitates from the reaction mixture and is recovered by filtration. The dyestuff thus obtained is oven dried and is thereafter ready for use.

The new dyestuffs of the invention are especially suited for the coloration of cellulosic textile materials, such as cotton, linen and viscose rayon, although they also may be effectively applied to silk, wool, nylon, and the like.

The dyestuffs are applied by treating the textile material in an aqueous solution (which may be a thickened printing paste) of the dyestuff in the presence of an acid-binding agent; for example, sodium hydroxide, sodium phosphate or sodium carbonate. The acid-binding agent may be added to the dye bath either prior to, simultaneously with, or after the addition of the dyestuff.

The dyestuff solution may contain commonly used dye bath adjuvants, such as sodium chloride, sodium sulfate, sodium alginate, urea or water-soluble alkyl ethers of cellulose.

The printing paste may contain commonly used adjuvants, such as urea, and thickening agents; e.g., methyl cellulose, starch and locust bean gum and sodium alginate.

Dyeing in the presence of the acid-binding agent is preferably carried out at elevated temperatures; for example, at temperatures between 60° C. and the boiling point of the dyestuff solution, in order to improve the exhaustion and fixation of the dyestuff.

The textile material printed with printing paste containing an acid-binding agent is preferably steamed or heated in order to fix the dyestuff on the textile material by linking the dye to the fiber.

When the acid-binding agent is applied to the textile material before or after the dyestuff, it is preferably applied by treating the fiber with an aqueous solution of the acid-binding agent; i.e., a padding technique. The aqueous solutions of acid-binding agents may also contain the common dye bath adjuvants.

Both the solution of acid-binding agent and dyestuff may be applied at room temperature or at elevated temperatures. The textile material can be dried between the two treatments if desired. It is preferred to heat or steam cellulosic material at an elevated temperature; for example, at 100° C. or higher, for a short period of time after application of the dyestuff and acid-binding agent to fix the dyestuff on the textile material by causing the dye to react with the hydroxyl groups of the cellulose.

The above techniques may be modified by substituting for the acid-binding agent a substance which on heating or steaming generates an acid-binding agent. Such substances include alkali metal bicarbonates, which on steaming yield alkali metal carbonates.

The fastness to washing or subsequent wet processing of the colorations produced using our new dyestuffs is improved by a scouring treatment; e.g., applying a hot aqueous solution of soap and sodium carbonate followed by rinsing in hot water prior to drying.

The new dyestuffs may also be applied to silk, wool, regenerated protein, nylon and modified polyacrylonitrile textile materials by using the conventional dyeing methods for those textile materials; i.e., dyeing from weakly acid dyebath solutions; for example, dyestuff solutions containing acetic acid or ammonium sulfate at a temperature above 80° C. When dyeing proteinaceous fibers in conjunction with an acidic catalyst, it is preferable to use a temperature between 80° C. and 100° C.

Our invention is further illustrated by the following examples:

EXAMPLE I

*1,4-bis(3-bromo-2-hydroxypropylamino)anthraquinone*

In portions, 47.6 g. (0.20 mol) of 1,4-diaminoanthraquinone is added to a mixture of 43.4 g. of glacial acetic acid and 8.3 ml. of water. To this mixture there is added slowly at 25° C., 23.3 g. (0.16 mol) of epibromohydrin. The temperature is raised to 79° C. during 45 minutes. During three hours and 45 minutes, there is added 59 g. (0.434 mol) of epibromohydrin at 79–82° C. Stirring is continued for eight hours at 80° C. The mixture is cooled to 20° C., diluted with 98 ml. of 15 volume percent of acetic acid and stirred for one hour. The solid is collected by filtration, broken up in a mortar and washed with 200 ml. of 32 volume percent acetic acid then dried under vacuum over calcium chloride and potassium hydroxide. There is obtained 86.4 g. (0.169 mol, 84% of product) of 1,4-bis(3-bromo-2-hydroxypropylamino)anthraquinone. Anal.: Calcd. for $C_{20}H_{20}O_4Br_2$ (512.2): Br, 31.2; N, 5.45. Found: Br, 27.2; N, 5.0.

A mixture of 20.5 g. (0.040 mol) of 1,4-bis(3-bromo-2-hydroxypropylamino)anthraquinone, 250 ml. of 95% ethanol, and 70 ml. (0.496 mol) of triethylamine is stirred under reflux for 23 hours. After distilling off excess triethylamine and ethanol, the residue is treated with a further quantity of ethanol. The tarry product so obtained is triturated with acetone and solidified. It is filtered off, washed with acetone, and dried at 60° C. under vacuum to 18 g. (0.0246 mol, 59%) of blue water-soluble dye.

EXAMPLE II

A swatch of 80 x 80 print cloth is padded with a 1% solution of the dye prepared in Example I. After an intermediate drying, the cloth is padded with an aqueous solution containing 20 g. of sodium carbonate and 200 g. of urea per liter. After an intermediate drying, the cloth is steamed for sixty seconds. After rinsing and soaping, a dyeing is obtained which is stable to hot alkaline soap solution, thereby indicating chemical attachment of the dye to the fiber.

EXAMPLE III

A mixture of 0.040 mol of the product obtained by condensing 1,4-diamino-2,3-dichloroanthraquinone with epibromohydrin according to the procedure in Example I, 250 ml. of 95% ethanol, and 60 ml. of dimethylaniline, is stirred with reflux for 18 hours. After distilling off the volatile components under vacuum, the residue it triturated with several portions of fresh acetone, whereupon it solidifies. The product is filtered off, washed with acetone, and dried at 50° C. under vacuum. There is obtained a good yield of a reddish-blue water-soluble dye.

EXAMPLE IV

The procedure of Example II is followed using a 1% solution of the dye of Example III. The fastness of the dyeing to soaping is once again much greater than that of the colorant from which the dyestuff is prepared, thus demonstrating fiber reactivity.

EXAMPLE V

The procedure of Example III is repeated using 1,4-diamino-2,3-dicyanoanthraquinone as a starting material. There is obtained in good yield a greenish-blue dye.

EXAMPLE VI

The procedure of Example III is repeated using 1,4-diamino-2-methoxyanthraquinone (CI 60755) as a starting material. There is obtained in good yield a reddish-blue dye.

EXAMPLE VII

A mixture of 250 ml. of 95% ethanol, 50 ml. of quinoline and 0.04 mol of the compound prepared by condensing 3-amino-4-(4'-nitrophenylazo)aniline with epibromohydrin according to the procedure of Example I is stirred and refluxed for twenty hours. After removing volatiles under vacuum, the residue is triturated with acetone and the product is filtered off, washed with acetone and dried at 50° C. to give a good yield of an orange water-soluble dye.

EXAMPLE VIII

The procedure of Example II is followed using a 1% solution of the dye of Example VII. The fastness of the dyeing to soaping is once again much greater than that of the colorant from which the new dyestuff is prepared, indicating reactivity of the dye with the fiber.

EXAMPLE IX

A mixture of 250 ml. of 95% methanol, 100 ml. of tri-n-propylamine and 17.9 g. (0.020 mol) of the product obtained by condensing four molecular proportions of epibromohydrin with the disazo dye identified in the Colour Index as CI 20000, is stirred under reflux for 23 hours. After distilling off the volatile materials, the residue is triturated with acetone, the solid product is filtered off, washed with fresh acetone, and dried under vacuum at 50° C. There is obtained 15.7 g. (76% yield) of brown water-soluble dye.

EXAMPLE X

The procedure of Example II is followed using a 1% solution of the dye of Example IX. The fastness of the dyeing to soaping is once again much greater than that of the colorant from which the new dyestuff is prepared, indicating reactivity of the dye with the fiber.

EXAMPLE XI

The procedure of Example IX is repeated using CI Solvent Brown 1 (CI 285), 1-naphthylamine→m-phenylenediamine as a starting material. There is obtained in good yield a brown dye.

EXAMPLE XII

The procedure of Example IX is repeated using o-toluidine→m-phenylenediamine (CI 11280) as a starting material. There is obtained in good yield an orange-yellow dye.

EXAMPLE XIII

The procedure of Example IX is repeated using p-nitroaniline→4-nitro-m-phenylenediamine (CI 11310) as a starting material. There is obtained in good yield a yellow dye.

EXAMPLE XIV

The procedure of Example IX is repeated using aniline→toluene-2,4-diamine (CI 11320B) as a starting material. There is obtained in good yield an orange dye.

EXAMPLE XV

The procedure of Example IX is repeated using the disazo dye CI Basic Brown 1 (CI 21000) as a starting material. There is obtained in good yield a brown dye.

EXAMPLE XVI

The procedure of Example IX is repeated substituting an equimolar amount of pyridine for the tri-n-propylamine. There is obtained in good yield a brown water-soluble dye.

EXAMPLE XVII

The procedure of Example IX is repeated substituting an equimolar amount of isoquinoline for the tri-n-propylamine. There is obtained in good yield a brown water-soluble dye.

EXAMPLE XVIII

The procedure of Example IX is repeated substituting an equimolar amount of 2,6-lutidine for the tri-n-propylamine. There is obtained in good yield a brown water-soluble dye.

EXAMPLE XIX

The procedure of Example IX is repeated substituting an equimolar amount of 4-picoline for the tri-n-propylamine. There is obtained in good yield a brown water-soluble dye.

EXAMPLES XX–XXVIII

The dyes of Examples XI–XIX were tested for fiber reactivity according to the procedure of Example II. In each case, after rinsing and soaping, a dyeing is obtained which is stable to hot alkaline soap solution.

EXAMPLE XXIX

A 5 g. quantity of 4-nitro-4'-(3-bromo-2-hydroxypropyl)aminoazobenzene and 75 ml. of pyridine dried over potassium hydroxide is charged to a 300 ml. three-necked flask equipped with reflux condenser, stirrer and thermometer. The mixture is heated to 104° C. and stirred for one hour at reflux (104–114° C.). A 60 ml. quantity of pyridine is distilled off and the residue is cooled to 60° C. and taken up in 500 ml. of acetone. The acetone-insoluble residue is dissolved in 600 ml. of water and filtered at 55–65° C. and washed with warm water. There is then added 140 g. of sodium chloride and the mixture is stirred for one hour at 30° C. The solids are washed with acetone and ether, triturated with ether and air dried. There is thus obtained 1.82 g. of the corresponding pyridinium salt.

EXAMPLE XXX

The dye of Example XXIX is applied to cotton cloth as a one percent aqueous solution. After an intermediate drying, the cloth is padded with an aqueous solution containing 20 g. sodium bicarbonate and 200 g. of urea per liter. After an intermediate drying, the cloth is washed at 75° C. for forty minutes. Substantially all of the color is removed by the hot soaping technique, thus indicating that the dye has no measurable fiber reactivity.

We claim:
1. A dyestuff of the formula:

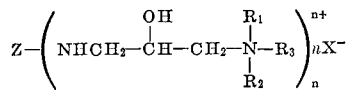

wherein Z is a water-insoluble aromatic dyestuff moiety selected from the group consisting of azo and anthraquinone; $R_1$, as an individual substituent, is a member selected from the group consisting of phenyl and lower alkyl, $R_2$, as an individual substituent, is lower alkyl, $R_3$, as an individual substituent, is lower alkyl, and $R_1$, $R_2$ and $R_3$ taken collectively with the N atom to which they are attached represent the residue of an azaaromatic nucleus selected from the group consisting of pyridine, lower alkylpyridines, quinoline, and isoquinoline; $n$ is an integer having a value of 2 to 4; and X is a member selected from the group consisting of chlorine and bromine, the secondary amino nitrogen of at least two of said $n$ groups being linked directly to one aromatic ring of the Z moiety.

2. A dyestuff of claim 1 wherein Z is azo, $R_1$, $R_2$ and $R_3$ are lower alkyl, $n$ is two and X is bromine.

3. A dyestuff of claim 1 wherein Z is anthraquinone, $R_1$ is phenyl, $R_2$ and $R_3$ are lower alkyl, $n$ is two, and X is bromine.

References Cited by the Examiner

UNITED STATES PATENTS

| | | | |
|---|---|---|---|
| 2,099,525 | 11/1937 | Krzikalla et al. | 260—156 |
| 2,716,655 | 8/1955 | Boyd | 260—381 |
| 2,900,216 | 8/1959 | Schwechten et al. | 260—567.6 |
| 3,040,064 | 6/1962 | Grossmann | 260—380 |
| 3,123,605 | 3/1964 | Turetzky et al. | 260—380 |

FOREIGN PATENTS 807,241   1/1959   Great Britain.

CHARLES B. PARKER, *Primary Examiner.*

FLOYD D. HIGEL, *Assistant Examiner.*